United States Patent Office 3,501,541
Patented Mar. 17, 1970

3,501,541
PROCESS FOR INTRODUCING AN ALKYL GROUP
Michael Dubeck, Birmingham, and James G. Jolly, Lathrup Village, Mich., assignors to Ethyl Corporation, New York, N.Y., a corporation of Virginia
No Drawing. Filed Mar. 14, 1968, Ser. No. 712,954
Int. Cl. C07c 15/02, 3/52
U.S. Cl. 260—668                                6 Claims

ABSTRACT OF THE DISCLOSURE

An alkyl group is introduced into a molecule by the reaction of an aldehyde and an alcohol in the presence of a catalytic quantity of a Group VIII metal dispersed on titanium dioxide. Apparently the reaction takes place as illustrated and exemplified by the following equation:

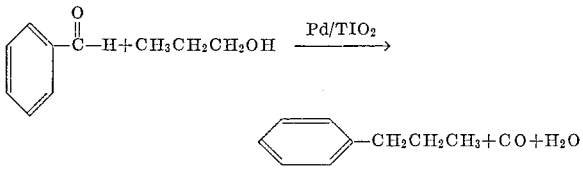

A preferred catalyst is palladium dispersed on titanium dioxide. The process can comprise either a batch or continuous method and is preferentially conducted at a temperature within the range of 150° to 275° C.

BACKGROUND OF INVENTION

Under the catalytic influence of dry hydrogen chloride, typical aldehydes react with alcohols to form hemiacetals and acetals; Fieser and Fieser, Advanced Organic Chemistry, Reinhold Publishing Corporation (1961). The process of this invention differs markedly from this prior art inasmuch as the aldehyde radical and hydroxylic group do not combine to form a different oxygen-containing functional radical.

As stated below the process of this invention is preferentially conducted with an aldehyde having an aryl group. In such an instance, the product is a substituted aryl compound. A particular example of this is illustrated by the equation above.

Alkylation of aromatic systems by methods other than disclosed herein have been known in the prior art for a long time. First, prior workers discovered that sulfuric acid, hydrogen sulfide, and Friedel-Crafts catalysts promoted alkylation of aromatic ring hydrocarbons. Later, side chain alkylation of aromatics was found to occur using alkali metals or alkali metal-containing catalysts. In this regard, reference is made to U.S. Patents 2,448,641, 3,006,976, 2,548,803, 2,728,802, 2,750,384, 3,160,670, 2,995,610, and 3,291,847. The alkylation of aromatic ring carbons according to the process of this invention differs markedly from the ring alkylations described in the patents cited above. Not only is the catalyst different but moreover, the starting materials are grossly unrelated.

SUMMARY OF THE INVENTION

In essence, this invention comprises the discovery that a catalyst such as palladium on titanium dioxide will catalyze alkyl substitution through an interaction of an aldehyde radical and a hydroxylic group. Apparently, the type of groups attached to the aforesaid reactive functional groupings is not critical. In other words, a wide variety of aldehydes and alcohols can be employed. Of these, it is preferred to use reactants which are stable, unhindered, and active.

A reactant is stable if it does not decompose by an extraneous side or competitive reaction under the reaction conditions employed, and if the product is stable under said conditions to a significant extent. Reactants are unhindered when they are free of bulky substituents that unduly retard the process by steric hindrance. Active starting materials are those which do not contain any substituents in such juxtaposition with the reactive sites as to cause inability to form the desired product because of a perturbation of the electronic configuration of the reactive sites.

In general, the compounds prepared by this process are known and they have many utilities known for them. For example, the hydrocarbons can be used as fuel blending stocks. Many of the liquid products can be used as solvents or reaction media. Many of the alkyl substituted aromatics can be used as catalyst rejuvenating agents for Group VIII metal catalysts which are used to isomerize olefins. Many of the compounds can be used as coolants as taught by Hengstebeck, U.S. 2,493,917. Many compounds having alkyl chains can be treated according to U.S. 3,322,849 and 3,293,318 to produce olefinic materials which can undergo reactions known for olefins. Compounds produced by this process can be used as chemical intermediates.

DESCRIPTION OF PREFERRED EMBODIMENTS

A preferred embodiment of this invention comprises a process for introducing an alkyl group into a molecule, said process comprising reacting an alcohol and an aldehyde in the presence of a catalyst consisting essentially of from about 0.05 to about 5.0 weight percent of palladium dispersed on titanium oxide; said alcohol being an acyclic monohydric terminal, primary alkanol having from 2 to about 12 carbon atoms, said alkanol being characterized by having at least two hydrogens bonded to the carbon atom adjacent to the terminal carbon bonded to hydroxyl group, said aldehyde having one aldehyde radical, said radical being bonded to a hyrocarbon moiety, said moiety having up to about 13 carbon atoms and being free of aliphatic olefinic bonds; said process being carried out at a temperature within the range of from about 150° to about 275° C., with an amount of catalyst of from about 0.1 to about 5 parts by weight of catalyst per each 10 parts by weight of said alcohol plus said aldehyde; the amount of said alcohol being not more than about 1.1 mole per each mole of said aldehyde.

The alcohols employed in the process of this invention have a primary alcohol group bonded to a carbon atom. Preferably the carbon atom bonded to the primary alcohol group is also bonded to at least two hydrogen atoms. In other words, a preferred class of alcohols has the configuration —CH$_2$—CH$_2$OH. Since the hydroxylic function can be considered a terminus of a chain at least two carbons long, these alcohols are referred to herein as terminal, primary alcohols.

The two carbon-containing configurations illustrated above can be bonded to hydrogen (ethanol) or an organic group. We are unaware of any critical limitation in size of the organic group. However, for economic reasons we prefer organic groups having up to 18, and more preferably up to 12, carbon atoms. The organic group can be substituted with functional groups—containing atoms other than carbon or hydrogen—which do not interfere with the process. Thus, the organic groups can contain halogen, alkoxy radicals, and the like. However, we prefer hydrocarbyl organic groups, since alcohols containing them are more readily available. In other words, we prefer that the organic groups be composed solely of carbon and hydrogen.

We are unaware of any critical requirement regarding the structure of the organic group. Preferably the group is aliphatic, more preferably paraffinic. Thus, in a highly preferred embodiment, we use acyclic, terminal, primary alkanols. Monohydric alkanols of this type are preferred. These can be represented by the formula R—CH$_2$—CH$_2$OH wherein R is hydrogen or an acyclic radical, either straight or branched chain, having up to about six carbon atoms. Typical alkanols of this type are n-propoanol, n-butanol, n-hexanol, n-octanol, n-decanol, n-dodecanol, n-octadecanol, 3-methylheptanol-1, 4-methylheptanol-1, 5-methylheptanol-1, 6-methylheptanol-1, 3,3-dimethylheptanol-1, 5,5-dimethylheptanol-1, 6,6-diemthylheptanol - 1,3 - methyl - 3 - ethylpentanol - 1, and the like. Highly preferred is n-propanol.

Preferred aldehydes have only one aldehyde radical. We are unaware of any critical limitation in the size of the organic group bonded to the aldehydo radical. Preferably it has up to about thirteen carbon atoms. Like the alcohols, the aldehydes used in this process can contain non-hydrocarbon functional groups. Thus, the aldehydes can have halogen, alkoxy, and similar radicals. Preferably, the organic group—bonded to the aldehydo radical—is solely composed of carbon and hydrogen.

The organic group can be selected from many types of radicals. Preferably, it is selected from alkyl, cycloalkyl, aralkyl, and alkaryl radicals. Typical alkyl and cycloalkyl radicals are listed below:

Alkyl
(1) acetaldehyde
(2) propionaldehyde
(3) caprylaldehyde
(4) decylaldehyde
(5) tetradecylaldehyde Cycloalkyl
(6) cyclohexylaldehyde
(7) 2-methylcyclohexylaldehyde
(8) 3-heptylcyclohexylaldehyde
(9) 2,4-diisobutylcyclohexyl-
    aldehyde
(10) cyclohexylacetaldehyde Because the products produced therefrom are generally more valuable, we prefer to use aldehydes containing a phenyl radical in the organic group. One type of aldehyde within this class are the aralkyl aldehydes. Some of these can be represented by the formula

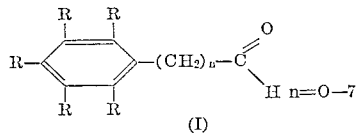

(I)

Within Formula I are two classes of compounds, (i) benzaldehyde and related compounds wherein the aromatic ring is substituted, and (ii) phenylacetaldehyde, homologs and analogs thereof. As with all aldehydes used in this invention, it is preferred—though not critical—that the compounds within Formula I contain up to about 14 carbon atoms. Hence, in a preferred embodiment, the number of carbon atoms about the ring in subclass (i)—excluding the carbon in the aldehydo radical—should not exceed about six. These carbons may appear in one or a plurality of substituent groups as illustrated by the illustrative but non-limiting examples below. As indicated by the following list, the various R's in Formula I are alkyl radicals.

(11) benzaldehyde
(12) o,m, or p-tolualdehyde
(13) 2,4-dimethylbenzaldehyde and the positional isomers thereof
(14) 2,2,4-trimethylbenzaldehyde and the postional isomers thereof
(15) 2,3,4,5-tetramethylbenzaldehyde and the positional isomers thereof
(16) pentamethylbenzaldehyde
(17) 4-n-heptylbenzaldehyde, its branched isomers, and the positional isomers thereof In addition to the above compounds, related species wherein the benzenoid nucleus is substituted by a plurality of other alkyl radicals, either alike or different can be employed.

The compounds in subclass (ii) may have substituents about the benzene ring as discussed and exemplified above. They differ from the compounds of subclass (i) by having the aldehydo radical bonded to a side chain rather than to a benzenoid ring. Typical illustrative, non-limiting compounds of subclass (ii) are
(19) phenylacetaldehyde
(20) 3-phenylpropionaldehyde
(21) 4-phenylbutyraldehyde
(22) 5-phenylvaleraldehyde
(23) 8-phenyloctaldehyde It is not necessary that the group bridging the benzenoid nucleus be a straight chain. Aldehydes wherein the bridging structure is branched are also applicable. Likewise, the benzenoid nucleus need not be on a terminal carbon. Thus, compounds such as (24) 5-phenyl-3,4-dimethylvaleraldehyde and (25) 3-phenylbutyraldehyde and the like can be employed.

There may be more than one benzenoid nucleus in the molecule. Some of these are defined and illustrated by

(II)

where $n=0$ or 1. It is not necessary that the aldehyde radical be para to the grouping containing the second benzene nucleus. Thus, the aldehydo radical may be in an ortho or meta position.

Likewise, the aldehyde can have a plurality of benzene rings in a fused ring system. Thus, the various naphthyl aldehydes

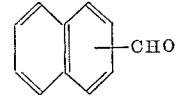

and the various methyl, dimethyl, trimethyl, ethyl, diethyl, methyl-ethyl, propyl and propyl-methyl derivatives thereof and the like can be employed. (Methyl-ethyl signifies the ring system with a methyl as well as a propyl group.) Similarly the various anthracene and acenapthene aldehydes

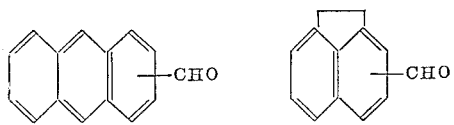

can be employed. The aldehyde radical can be substituted on any carbon in these ring systems. Alkyl substituents such as those discussed in the naphthalene series can be bonded to the ring carbons. Similarly, aldehydes derived by substitution of an aldehydo radical on

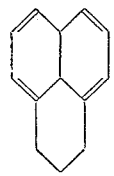

can be used. Of the aldehydes having fused ring systems as discussed above, those having up to about 14 carbons are preferred.

The catalyst employed consists essentially of palladium dispersed on titanium dioxide. The catalyst can be in various states of aggregation such as pellets or tablets. In many instances finely divided material is preferred because it provides larger surface area and thus increases the efficiency of the catalyst. The catalyst can be prepared by any one of the many methods known to catalyst manufacturers. For example, the titanium dioxide may be merely impregnated with a solution of a soluble salt of palladium followed by calcining to decompose the salt to the free metal. This method of preparation of the catalyst is illustrated by the following example.

Example I 5.0 percent Pd on $TiO_2$.—A palladium complex solution was prepared by dissolving 8.33 g. $PdCl_2$ in 150 ml. concentrated $NH_4OH$ solution. This solution was added to 100 g. of titania support. These components were mixed and evaporated in a rotary evaporator at <85° C. until dry. The impregnated pellets were heated in a furnace for two hours at 500° C. and then one hour at 600° C.

1.0 percent Pd on $TiO_2$.—A palladium complex solution was prepared by dissolving 1.66 g. $PdCl_2$ in 50 ml. concentrated $NH_4OH$ solution. This solution was added to 100 g. of titania support. After some drying on a rotary evaporator, the impregnated material was heated at 500° C. for two hours.

0.5 percent Pd on $TiO_2$.—Following the procedure above, a third catalyst preparation was made using 0.83 g. $PdCl_2$ in 75 cc. $NH_4OH$ solution (conc.) and 100 g. titania. The palladium-ammonia complex on titania was decomposed at 500° C. for two hours yielding the finished catalyst.

In a similar manner the relative amounts of titania and soluble palladium salt can be varied to prepare catalysts having from about 0.05 to about 5.0 weight percent of palladium dispersed on the titanium dioxide.

The reaction temperature is not critical. The process is carried out at a temperature from about 140° to about 290° C. A highly preferred reaction temperature is from about 150° to about 275° C.

Atmospheric pressure, or higher, or lower pressures, can be employed. In general, a preferred pressure range is from about 0.1 to about 20 atmospheres; a most preferred range being from 1 to about 15 atmospheres. In short, reaction pressure is not critical.

The reaction time is not a truly independent variable but is dependent at least to some extent on the other process conditions employed. In general, higher temperatures usually result in a decrease of reaction time. Furthermore, the reaction time depends on the amount of the catalyst used for a given amount of reactants and on the specific metal catalyst since some catalysts are more active than others. When carrying out the process as a batch operation, reaction times of from about 2 to about 40 hours are usually sufficient.

The amount of catalyst employed in this process is not critical. However, it is preferred that an amount of catalyst be used which affords a reasonable reaction rate. In general, when the process of this invention is carried out as a batch operation, from about 0.01 to about 10 parts by weight of catalyst (consisting of a metal on a support is employed) per each 10 parts of aldehyde plus alcohol. A preferred range is from about 0.1 to about 5 parts by weight.

The process of this invention can be carried out as a batch process or as a continuous operation. In a continuous process, the reactants either in vapor or in liquid phase, are from about 0.01 to about 10 parts by weight of catalyst (consisting of a metal on a support) per each 10 parts of aldehyde plus alcohol. A preferred range is from about 0.1 to about 5 parts by weight.

In a continuous process, the reactants either in vapor or in liquid phase, are contacted with the catalyst. For practical reasons, liquid phase operations are preferred. When carrying out the process of this invention as a batch operation, it is preferred that a liquid phase be present.

A very important feature of this invention is the fact that the catalyst employed in this process may be re-used and, thus, improve the economics of the process.

Solvents which may be employed (in batch operations) should be inert under the reaction conditions. Non-aqueous materials such as the saturated hydrocarbons, e.g., pentane, hexane, isopentane, dodecane, ligroin, No. 9 oil, and the like are preferred.

The processes of this invention may be carried out either in air or in an inert atmosphere. When an inert atmosphere is desired, nitrogen is preferred, mainly for economical reasons. However, other inert gases may be used with equal success.

When the process of this invention is a continuous process, an additional variable of space velocity is introduced. Space velocity may be defined by the following relationship:

$$\text{Space velocity (s.v.)} = \frac{\text{ml. reactants injected/ml. catalyst}}{\text{hours}}$$

The above formula for calculating space velocity holds whether the reactants are in liquid or gas phase. The value for space velocity, however, will be substantially different when the olefin is in one or the other physical state. For example, when the reactants are injected in a liquid state, space velocity generally is in the range of from 0.1 to about 10, and more preferably, from 0.5 to about 3. On the other hand, when the reactants are in a gaseous state, spaced velocity is in the range of from about 50 to about 500. The reason for the difference in the values for space velocity is that there is substantially much less reactant in each milliliter of reactant in a gaseous state than in each milliliter in a liquid state.

Space velocity is thus a measure of the speed with which reactants are passed through the reaction tube containing the catalyst bed. Space velocity in a continuous process, similarly as the reaction time in a batch process, is not a directly independent variable. It depends on the reaction temperature, the activity of a particular catalyst employed, and the degree of reactivity inherent in the reactants. In order to achieve a given amount of reaction, the space velocity generally will be different for different catalysts even if all other variables remain constant.

In a continuous process, occasionally a single pass of reactants through the reaction column might not yield the desired degree of reaction. In such cases, the partially reacted material can be recycled.

For best results the amount of the alcohol employed in the process should not be more than about 1.3 moles—preferably 1.1 mole per each mole of aldehyde. On the other hand, the aldehyde can be employed in large excess. For example, in many instances it is desirable to use enough aldehyde whereby the excess acts as a solvent or suspension reaction medium.

Example II

An equimolar mixture of benzaldehyde and n-propanol was fed with a syringe pump to a hot tube packed with 40 cc. of 0.5 weight percent palladium on $TiO_2$ catalyst. The feed was initiated when the catalyst bed was at 162° C. The temperature of the catalyst bed was increased step-wise to 207°, 232°, and 253° C.

Samples of the liquid product obtained after passage (through the catalyst bed) were obtained at each of the latter three reaction temperatures. The samples were taken after the catalyst-reaction mixture had reached equilibrium at these temperatures.

Vapor phase chromatographic analysis demonstrated the presence of n-propylbenzene in the samples taken at 232° and 253° C. A sample of the n-propylbenzene was isolated from the VPC column. Its infrared spectrum was compared to a spectrum of an authenic sample of n-propylbenzene and found to be identical in all material respects.

About 50 percent of the benzaldehyde was converted. At 253° C. about 30 percent yield of n-propylbenzene was obtained.

Similar results are obtained when the mole ratio of benzaldehyde to propanol is 1.0:1.1.

The following examples are conducted using the procedure of Example II. The catalysts are defined as weight percent palladium on $TiO_2$. Thus, in Example III where it says "0.05," this means the catalyst is "0.05 percent palladium on titania." In the examples, LHSV stands for "liquid hourly space velocity." By-products are in parentheses.

Example III

Starting materials:
  (a) ethanol (1 mole)
  (b) propionaldehyde (1 mole)
  (c) 0.05
Reaction conditions:
  200°
  LHSV 1
Product:
  butane
  (propane and pentane)

Example IV

Starting materials:
  (a) n-octanol (1 mole)
  (b) tetradecylaldehyde (1 mole)
  (c) 0.8
Reaction conditions:
  200°
  LHSV 1.5
Product:
  heneicosane
  (pentadecane and heptcosane)

Example V

Starting materials:
  (a) n-heptanol (1 mole)
  (b) cyclohexylaldehyde (1 mole)
  (c) 0.5
Reaction conditions:
  215°
  LHSV 2.5
Product:
  heptylcyclohexane
  (tridecane)

Example VI

Starting materials:
  (a) β-phenylethanol (1 mole)
  (b) benzaldehyde (1 mole)
  (c) 1.0
Reaction conditions:
  180°
  LHSV .8
Product:
  1,2-diphenylethane
  (1,3-diphenylpropane)

Example VII

Starting materials:
  (a)-n-dodecanol (1 mole)
  (b) p-methoxybenzaldehyde (1 mole)
  (c) 3.0
Reaction conditions:
  150°
  LHSV 1.5
Product:
  p-undecylanisole
  (tricosane and 1,3-di-pentafluorophenylpropane)

Example VIII

Starting materials:
  (a) β-pentafluorophenylethanol (1 mole)
  (b) m-fluorobenzaldehyde (1 mole)
  (c) 2.0
Reaction conditions:
  275°
  LHSV 2
Product:
  1-pentafluorophenyl-2-m-fluorophenyl ethane
  (1,3-di-cyclohexylpropane)

Example IX

Starting materials:
  (a) β-cyclohexylethanol (1 mole)
  (b) p-nitrobenzaldehyde (1 mole)
  (c) 2.0
Reaction conditions:
  250
  LHSV 2.5
Product:
  1-cyclohexyl-2-p-nitrophenylethane
  (1-p-bromophenyl-2-phenylethane)

Example X

Starting materials:
  (a) β-p-bromophenylethanol (1 mole)
  (b) benzaldehyde (1 mole)
  (c) 5.0
Reaction conditions:
  250°
  LHSV 3
Product:
  1,3-di-p-bromophenylpropane
  (1-nitro-3-phenylpropane)

Example XI

Starting materials:
  (a) 3-nitropropanol (1.5 mole)
  (b) benzaldehyde (1 mole)
  (c) 0.5
Reaction conditions:
  180°
  LHSV 1.5
Product:
  1,5-dinitropentane As illustrated by the non-limiting examples given below, a mixture of products can be obtained in some instances. Thus, in Example III it is indicated that propane, butane and pentane can be formed when the process of this invention is employed using a mixture of ethanol and propionaldehyde as starting material. For the purpose of this invention, the butane can be considered as the product since it will arise upon interaction of the alcohol and the aldehyde. On the other hand, any propane or pentane formed can be considered as a by-product because they will presumably arise respectively by the interaction of two molecules of ethanol and two molecules of the aldehyde.

The mechanism by which the process of this invention occurs is not definitely known. However, it can be rationalized as exemplified according to the following scheme for the reaction of benzaldehyde and n-propanol. This scheme is recited here for purposes of illustration only; we are not bound by any theory embodied therein.

First, we envision a reaction whereby propionaldehyde and hydrogen is formed by dehydrogenation of the propanol. Next, we believe this aldehyde reacts (by a mechanism similar to an aldol condensation with benzaldehyde to form the following compound.

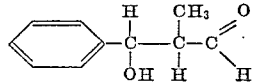

Then, we believe, this intermediate is dehydrated to form a compound having an olefinic bond between the carbon atom adjacent to the ring and the carbon bonded to the aldehyde radical. Apparently, the next step is a decarbonylation whereby CO and propenylbenzene is formed. Lastly, this product is hydrogenated by the hydrogen from the first step to form n-propyl benzene.

Example XII

In a suitable reaction vessel is placed 800 ml. dodecane reaction medium, one mole of n-octanol, and one mole of p-tolualdehyde. The contents are heated to 195° C. for one hour in the presence of 10 grams of 2 percent by weight palladium on titania.

The product p-heptyl toluene and by-product pentadecane are removed from the resultant reaction mixture by distillation.

Similar results are obtained when the amount of catalyst is from about 0.1 to about 5 parts by weight for each 10 parts of aldehyde plus alcohol.

In the following example, the procedure employed is similar to the procedure of Example XII. The amount of catalyst is one part by weight per each part of aldehyde plus alcohol. As before, by-products are in parenthesis. The catalyst is defined as previously.

Example XIII

Starting materials:
   (1) decanol
   (2) β-naphthaldehyde
   (3) 2.5
Reaction conditions:
   210°
   500 ml. diphenylether
Product:
   β-dodecylnaphthalene
   (nonadecane)

Example XIV

Starting materials:
   (1) 8-chlorooctanol
   (2) α,α-dimethylbutyraldehyde
   (3) 1.5
Reaction conditions:
   170°
   750 ml. hexadecane
Product:
   3,3-dimethyl-11-chloroundecane
   (1,15-dichloropentadecane)

Example XV

Starting materials:
   (1) 5-chloropentanol
   (2) 1-phenanthraldehyde
   (3) 1.0
Reaction conditions:
   180°
   600 ml. nitrobenzene
Product:
   1-[5-chloropentyl]phenanthrene
   (1,8-dichlorooctane)

As can be seen, the process of this invention has wide applicability. In other words, it can be applied to many different alcohols and aldehydes. Thus, for example, applicable aldehydes are the specific compounds mentioned in Items (1)–(23) above. These can be reacted, for example, according to the procedures of the above examples.

Having fully described the process of this invention, its advantages, and utility, it is desired that this invention be solely limited by the lawful scope of the appended claims.

We claim:
1. Process for introducing an alkyl group into a molecule, said process comprising reacting an alcohol and an aldehyde in the presence of a catalyst consisting essentially of from about 0.05 to about 5.0 weight percent of palladium dispersed on titanium oxide;
   (i) said alcohol being an acyclic monohydric terminal, primary alkanol having from 2 to about 12 carbon atoms, said alkanol being characterized by having at least two hydrogens bonded to the carbon atom adjacent to the terminal carbon bonded to hydroxyl group,
   (ii) said aldehyde having one aldehyde radical, said radical being bonded to a hydrocarbon moiety, said moiety having up to about 13 carbon atoms and being free of aliphatic olefinic bonds;
said process being carried out at a temperature within the range of from about 150° to about 275° C., with an amount of catalyst of from about 0.1 to about 5 parts by weight of catalyst per each 10 parts by weight of said alcohol plus said aldehyde; the amount of said alcohol being not more than about 1.1 mole per each mole of said aldehyde.

2. Process of claim 1 wherein said alcohol is n-propanol, said aldehyde is benzaldehyde, said catalyst is 0.5 weight percent palladium on titanium dioxide and said reaction temperature is from about 232° to about 255° C.

3. Process of claim 1 wherein said alkanol is n-propanol.

4. Process of claim 1 wherein said hydrocarbon moiety in said aldehyde is selected from alkyl, cycloalkyl, aralkyl, and alkaryl radicals.

5. Process of claim 1 wherein said aldehyde is benzaldehyde.

6. Process of claim 1 wherein said catalyst is 0.5 weight percent palladium dispersed on titanium dioxide.

References Cited

UNITED STATES PATENTS 2,512,649   6/1950   Howard et al. _____ 260—676

OTHER REFERENCES

Badin: J.A.C.S., 65, pp. 1809–1813 (1943).

DELBERT E. GANTZ, Primary Examiner
CURTIS R. DAVIS, Assistant Examiner

U.S. Cl. X.R.

260—612, 644, 652, 653, 666, 671, 676